United States Patent
Bürkle et al.

(10) Patent No.: US 8,297,179 B2
(45) Date of Patent: Oct. 30, 2012

(54) PROCESS FOR HARDENING AN ANNULAR GROOVE OF A PISTON HEAD BY MEANS OF LASER BEAMS AND A PISTON PRODUCED BY THE PROCESS

(75) Inventors: Gunter Bürkle, Benningen (DE); Christian Schaller, Billigheim (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 611 days.

(21) Appl. No.: 12/303,178

(22) PCT Filed: Feb. 13, 2007

(86) PCT No.: PCT/EP2007/001199
§ 371 (c)(1),
(2), (4) Date: Dec. 2, 2008

(87) PCT Pub. No.: WO2007/140826
PCT Pub. Date: Dec. 13, 2007

(65) Prior Publication Data
US 2009/0255113 A1 Oct. 15, 2009

(30) Foreign Application Priority Data
Jun. 3, 2006 (DE) .......................... 10 2006 026 109

(51) Int. Cl.
*F16J 1/04* (2006.01)
*B23P 15/10* (2006.01)
(52) U.S. Cl. .................... 92/223; 92/172; 29/888.049
(58) Field of Classification Search .................... 92/172, 92/223; 29/888.049; 219/121.85
See application file for complete search history.

(56) References Cited

U.S. PATENT DOCUMENTS

| | | | | |
|---|---|---|---|---|
| 4,125,926 A | * | 11/1978 | Gale et al. ................. | 29/888.049 |
| 5,515,770 A | | 5/1996 | Clark | |
| 6,592,690 B1 | * | 7/2003 | Weis et al. ............... | 219/121.85 |

FOREIGN PATENT DOCUMENTS

| | | |
|---|---|---|
| DE | 19508584 C1 | 2/1996 |
| DE | 10337962 A1 | 3/2005 |
| EP | 1173624 B1 | 9/2003 |
| JP | 57171617 A | 10/1982 |
| JP | 61149424 A | 7/1986 |
| JP | 02104612 A | 4/1990 |

OTHER PUBLICATIONS

International Search Report dated Aug. 22, 2000 for PCT/DE00/00919.
International Search Report dated Jun. 13, 2007 for PCT/EP2007/001199.

* cited by examiner

*Primary Examiner* — Michael Leslie
(74) *Attorney, Agent, or Firm* — Young Basile

(57) ABSTRACT

A process for hardening an annular groove of a piston head of a piston of an internal combustion engine by means of laser beams, in which, at least the annular groove to be hardened is provided before or directly during the hardening process with a coating which absorbs the energy of laser beams. The coating is subsequently irradiated by the laser beams. The absorbing layer can be a manganese phosphate coating or is formed in situ by treating the component surface with a process gas comprising oxygen and inert gas. Furthermore, the laser beams are directed at the piston during hardening at an oblique angle to the direction of rotation. The advantages achieved are avoidance of reflections and undesirable hardening of the bottom of the groove, an increased degree of absorption and reduced distortion of the piston.

5 Claims, 1 Drawing Sheet

PROCESS FOR HARDENING AN ANNULAR GROOVE OF A PISTON HEAD BY MEANS OF LASER BEAMS AND A PISTON PRODUCED BY THE PROCESS

BACKGROUND

The invention relates to a process for hardening an annular groove of a piston head of a steel piston of an internal combustion engine and a piston produced by the process.

A process for hardening an annular groove of a piston head of a steel piston of an internal combustion engine by means of laser beams is known from EP 1 173 624 B1. In this process, a laser beam for hardening the annular grooves is directed at the piston in an approximately circumferential direction. As a result of the approximately tangential beam line, reflection of the laser beams in the direction of the bottom of the groove and, with a correspondingly small angle of incidence, a reflection against the oppositely located groove flanks is prevented. However, the disadvantage is that for adequate hardening, the laser beam must possess high energy with the result that the hardening process can be carried out only very slowly. As a result, when producing such pistons, cycle time in serial production is disadvantageously slowed. Additionally, because of the high laser energy is disadvantageous in that there is a risk of distortion of the piston head area.

It would be desirable to provide a process and a piston in which the hardening procedure using laser beams, which is intrinsically satisfactory, is retained, but at the same time the prior art disadvantages are avoided.

SUMMARY

A process for hardening the annular groove of a piston by means of laser beams, in which at least the annular groove to be hardened is provided with a coating or layer which absorbs the energy of the laser beams before or during the hardening process, and then the coating is irradiated with the laser beams. In a particularly advantageous way, the layer is a manganese phosphate coating or oxide layer, where this material places no restrictions on the coating.

After the piston blank produced in an unspecified process (e.g. forging or casting) is initially finish machined and brought to size, the layer that absorbs the energy of the laser beams is applied, specifically a manganese phosphate coating is applied. The layer advantageously absorbs the energy of the laser beams so that reflections are prevented and uncontrolled hardening of the irradiated area, specifically the bottom of the groove, is precluded. Due to the increased degree of absorption, reduced laser beam energy and, at the same time, faster feed rate (in particular in the rotational direction) is possible. In addition, during the hardening by means of laser beams, the entire piston is heated less and thus the danger of distortion that results in dimensional inaccuracy and thus rejects is considerably reduced.

A manganese phosphate coating is useful because the MnPh layer is usually applied to the piston anyway such that an additional process is not required. Alternative layer include, for example, (this is not an exhaustive list): pickling, black-oxide finishing, poling, absorbent layers in general, oxide layers, heat tinting.

A further advantage of the process can be seen in that cleaning the piston, specifically the annular groove, before the laser treatment is not necessary since this has already been performed before the application or after the application of the coating. The process can be carried out either with a stationary piston and rotating laser beams or, conversely, with a stationary laser beam source and a rotating piston.

In a further aspect, the laser beams are directed at the piston at an oblique angle to the direction of rotation during its movement during the hardening process. Since an area in the periphery is created during laser hardening that basically comprises either an overlapping or a non-hardened zone ("slip"), the laser beam (=direction of feed) is directed at the piston at an oblique angle to the direction of rotation.

The piston can be a one-piece piston which can be produced particularly easily and hardened using this process.

BRIEF DESCRIPTION OF THE DRAWING

An embodiment of the invention to which it is, however, not restricted, is, described briefly hereafter and explained on the basis of the figures in which.

DETAILED DESCRIPTION

Figure 1:
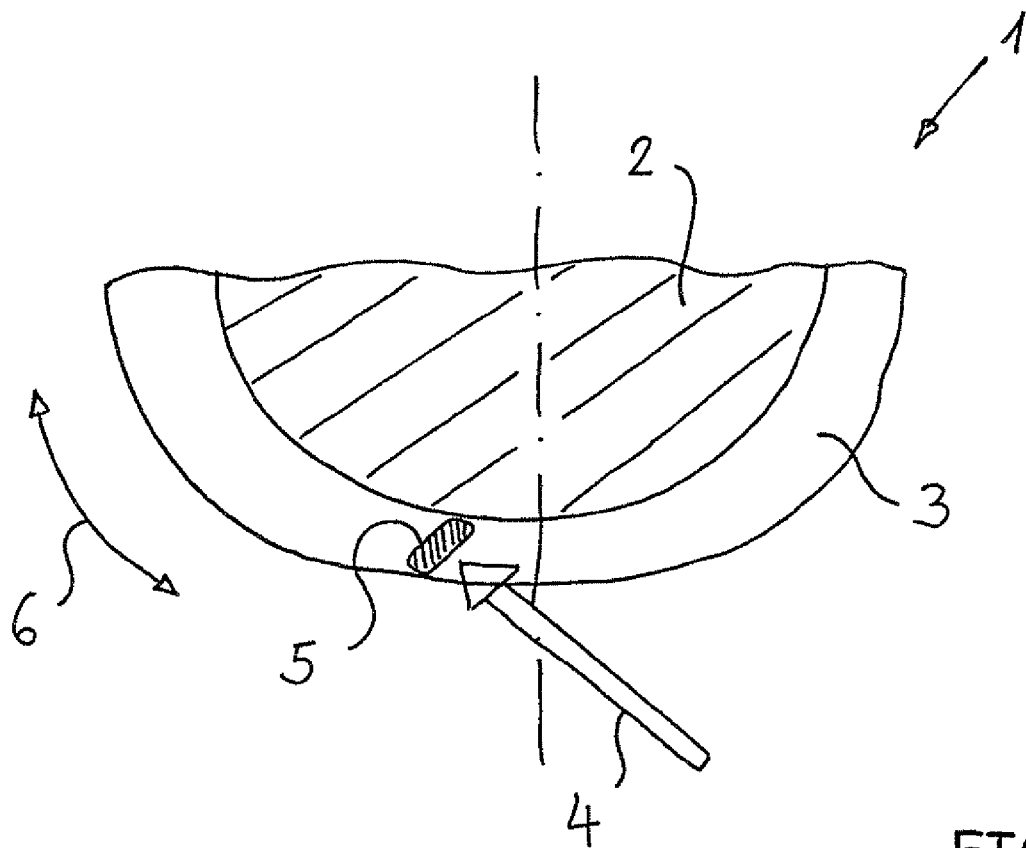
FIG. 1 is a cross-sectional view of a piston using a laser beam hardening process.
Figure 2:
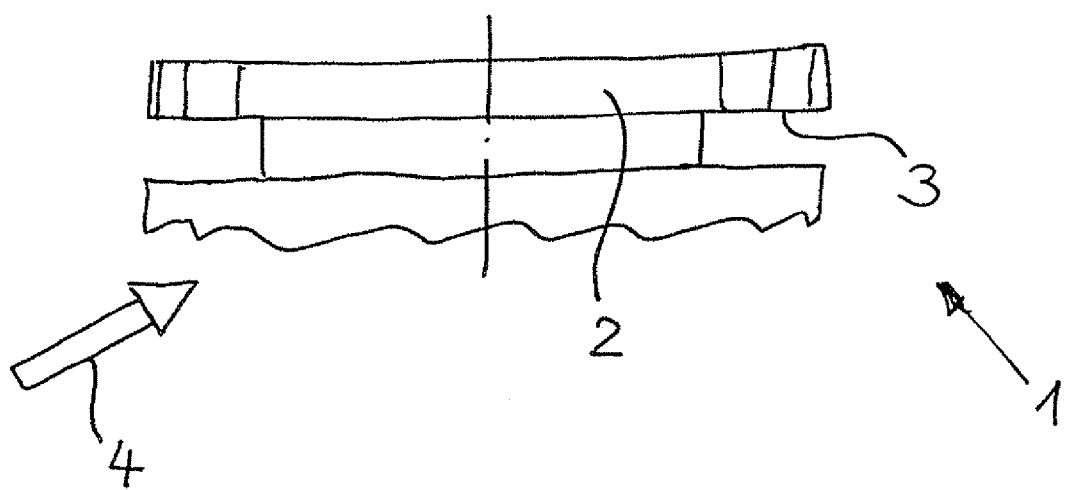
FIG. 2 is a longitudinal side elevational view of the piston using a laser beam hardening process.

FIGS. 1 and 2 show a piston head 1 of a piston of an internal combustion engine, wherein the piston is made of steel which can be hardened by using laser beams. A piston of this kind has the customary elements, as for example, a ring belt, a combustion chamber bowl, if needed, a piston skirt and piston pin bores, which for the sake of simplifying the illustration in FIGS. 1 and 2 are not shown.

In FIG. 1 it can be seen that around the inner area 2 of the piston head 1 there is a groove lower flank 3 (or groove upper flank, depending on the way it is viewed) for an annular groove which is irradiated by laser beams. The irradiation by means of laser beams 4 does not take place until at least at the annular groove to be hardened has been provided with a layer which absorbs the energy of the laser beams 4 on the lower and/or upper flank and, if necessary, also on the surface of the piston in the area of the ring belt before hardening, or directly during the hardening process (heat tinting). If the laser beams 4 are aimed at the lower flank of the groove 3, a focal spot 5 is created to harden the lower flank of the groove 3. During the hardening process, the source of the laser beams 4 remains static while the piston head 1 turns in the direction of rotation 6. Conversely, it is also conceivable that the piston head 1 remains stationary while the source of the laser beams 4 rotates around the piston head 1.

In FIGS. 1 and 2 it can be seen that the laser beams 4 are directed at an oblique angle to the direction of rotation 6 during the motion of the piston head 1 while it is being hardened. In the process, the laser beams 4 are directed at the piston center axis or can diverge from it. Overall, the process and the piston of the internal combustion engine produced in accordance with this process offers reduced annular groove wear as the result of hardened material, in particular, the groove lower flank 3, increased process stability, lower manufacturing costs (in particular by eliminating a cleaning station) as well as the reduction or even prevention of distortion in the hardened areas and the areas of the piston next to the hardened areas.

What is claimed is:

1. A process for hardening an annular groove of a piston head of a piston of an internal combustion engine by means of a laser beam comprising the steps of:

before a hardening by the laser beam, providing at least the annular groove with a layer of manganese phosphate which absorbs the energy of the laser beam; and irradiating the layer by the laser.

2. The process of claim 1 further comprising the step of:

directing the laser at an oblique angle to a longitudinal axis of direction at the piston during the relative motion between the piston and the laser beam during the hardening step.

3. A piston of an internal combustion engine having an annular groove in a piston head made by the process comprising the steps of:

before a hardening by a laser beam, providing at least the annular groove with a layer of manganese phosphate which absorbs the energy of the laser beam; and irradiating the layer by the laser.

4. The piston of claim 3 wherein the piston is a one-piece piston.

5. The piston of claim 3 further comprising the step of:

directing the laser at an oblique angle to a longitudinal axis of direction at the piston during the relative motion the piston and the laser beam during the hardening step.

* * * * *